May 11, 1943.   C. A. SIVER   2,318,721
FLUID PRESSURE REGULATOR
Filed Jan. 11, 1941   3 Sheets-Sheet 1

INVENTOR
CHESTER A. SIVER
BY
ATTORNEY

May 11, 1943.  C. A. SIVER  2,318,721
FLUID PRESSURE REGULATOR
Filed Jan. 11, 1941  3 Sheets-Sheet 2

INVENTOR
CHESTER A. SIVER
BY
ATTORNEY

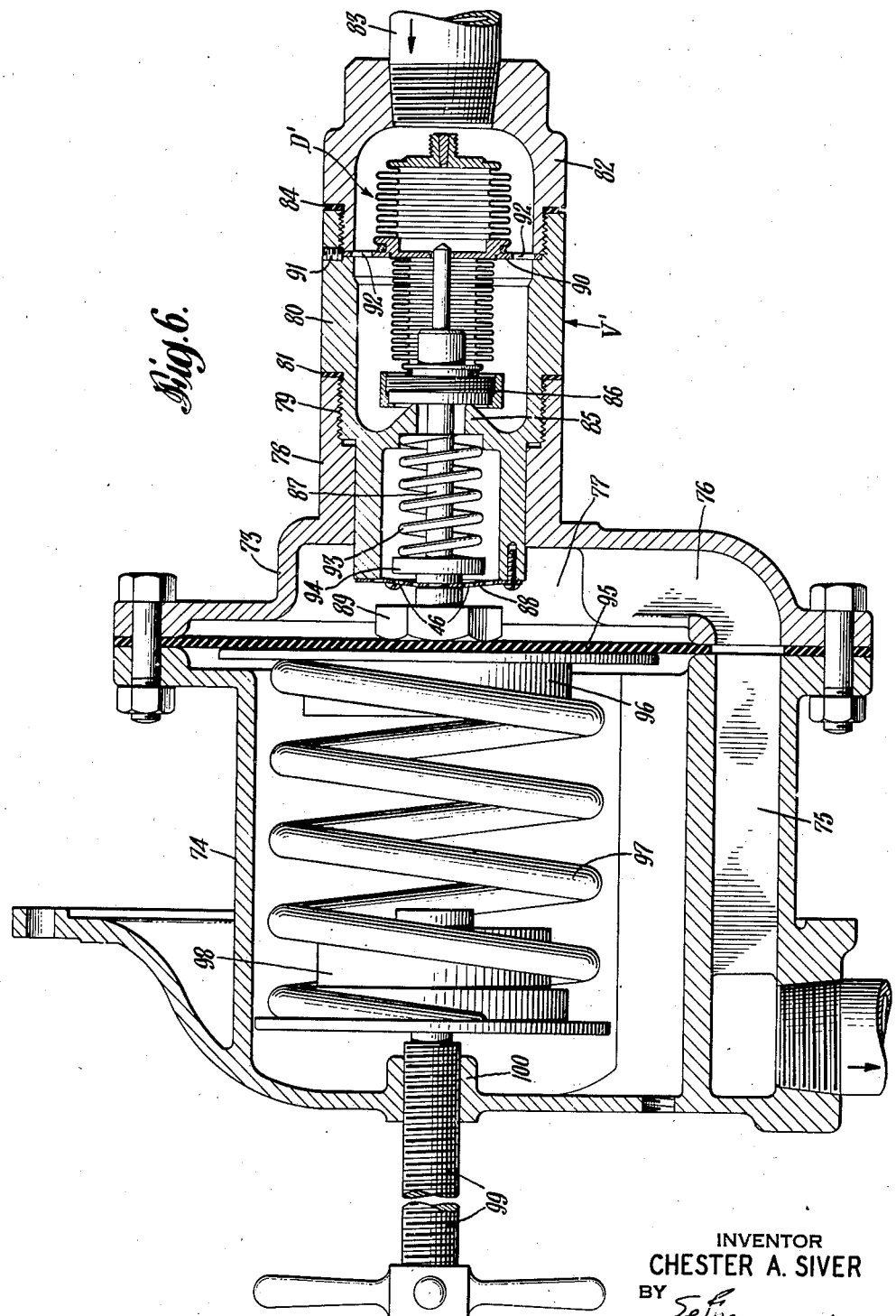

Patented May 11, 1943

2,318,721

UNITED STATES PATENT OFFICE 2,318,721

FLUID PRESSURE REGULATOR

Chester A. Siver, United States Navy, assignor to Union Carbide and Carbon Corporation, a corporation of New York Application January 11, 1941, Serial No. 374,072

13 Claims. (Cl. 50—23)

The present invention relates to a fluid pressure regulator for regulating pressures within very close limits. More particularly, the invention relates to a sensitive fluid pressure regulator, for acetylene gas or the like, having a frictionless type valve unit and novel means for damping vibration of the valve during the passage of fluid through the regulator. In addition, the invention relates to a novel unitary valve assembly including a valve and novel means for damping motion of the valve.

Although the novel pressure regulator of the present invention has since proved valuable wherever fluid pressure regulation is desired, it was originally developed primarily for use in a synchronization system for a plurality of concurrently operating acetylene generators which are arranged to discharge gas into a common delivery conduit, as fully disclosed and claimed in application Serial No. 331,678, filed April 26, 1940 by the present inventor. In order to operate a plurality of acetylene generators discharging to a common delivery conduit so that all generators will supply equal shares of the load and none will be overloaded, and so that the charges of calcium carbide in all generators will be consumed at the same rate, it is important that the individual rates of gas flow from all concurrently operating generators be mutually equalized at any total rate of gas flow in the common delivery conduit. Equalization of rates of gas flow is accomplished by discharging gas from the several generators through pressure regulators, having the same constant operating characteristics, which are all set to discharge gas to the common delivery conduit at the same pressure.

In the development of the synchronization system mentioned above, ordinary pressure regulators of the friction type, wherein a valve stem is frictionally guided in a drag sleeve, first were installed in the individual discharge ducts of the several generators, and all were adjusted accurately to deliver gas at the same pressure to the common delivery conduit at a particular rate of gas flow therein. This adjustment provided for equalized rates of gas flow from all concurrently operating generators at the particular rate of gas flow at which the regulators originally were set; but when the demand for gas either increased or decreased with respect to the rate of gas flow at which the regulators originally were set, it was found that the operating characteristics of the several regulators were so different that equalized rates of flow could no longer be obtained. The principal reasons for the variable operating characteristics of friction type regulators were found to reside in the differences in characteristics of the adjusting springs of the several regulators, and the variations in friction between the valve stems and the drag sleeves.

In order to overcome the disadvantages of the friction type regulator, pressure regulators having matched adjusting springs, and embodying frictionless type valve units, were inserted in the discharge ducts of the several generators. Although this type of regulator gave somewhat better results, it was found that the operating characteristics of the several regulators still did not coincide because the gas flowing through the regulators caused the free floating valves to vibrate toward and away from the valve seat, thus producing large fluctuations in the individual rates of gas flow. Two other types of regulators which were tried previously to the development of the present invention were the ordinary balanced type regulator, and the pilot type regulator, both of which are sufficiently sensitive and accurate for most purposes. Neither of these latter types of regulators, however, was satisfactory.

The principal object of the present invention is to provide a novel fluid pressure regulator for regulating pressures accurately within very close limits. Other objects are to provide a novel fluid pressure regulator construction whereby any number of pressure regulators constructed in the same way will have substantially the same operating characteristics at any rate of fluid flow; to provide a fluid pressure regulator having a frictionless valve unit which will not be subject to detrimental vibrations during the passage of gas; to provide a pressure regulator including a removable unitary valve assembly having means for damping motion of the valve; to provide a unitary valve assembly, having means for damping motion of the valve; and to provide a novel dash-pot of particular value for use in a pressure regulator.

The above and other objects and the novel features of the invention will become apparent from the following description, taken with the accompanying drawings, wherein:

Fig. 5 is a plan view of a part of the regulator of Fig. 1; and

Fig. 6 is a longitudinal sectional view, parts being in elevation, of a modified form of pressure regulator embodying the invention.

The principles of construction of the invention will be described, by way of example only, as applied to a gas pressure regulator for acetylene gas. It is to be understood, however, that the principles may be applied to regulators for liquids as well as other gases.

Figure 1:
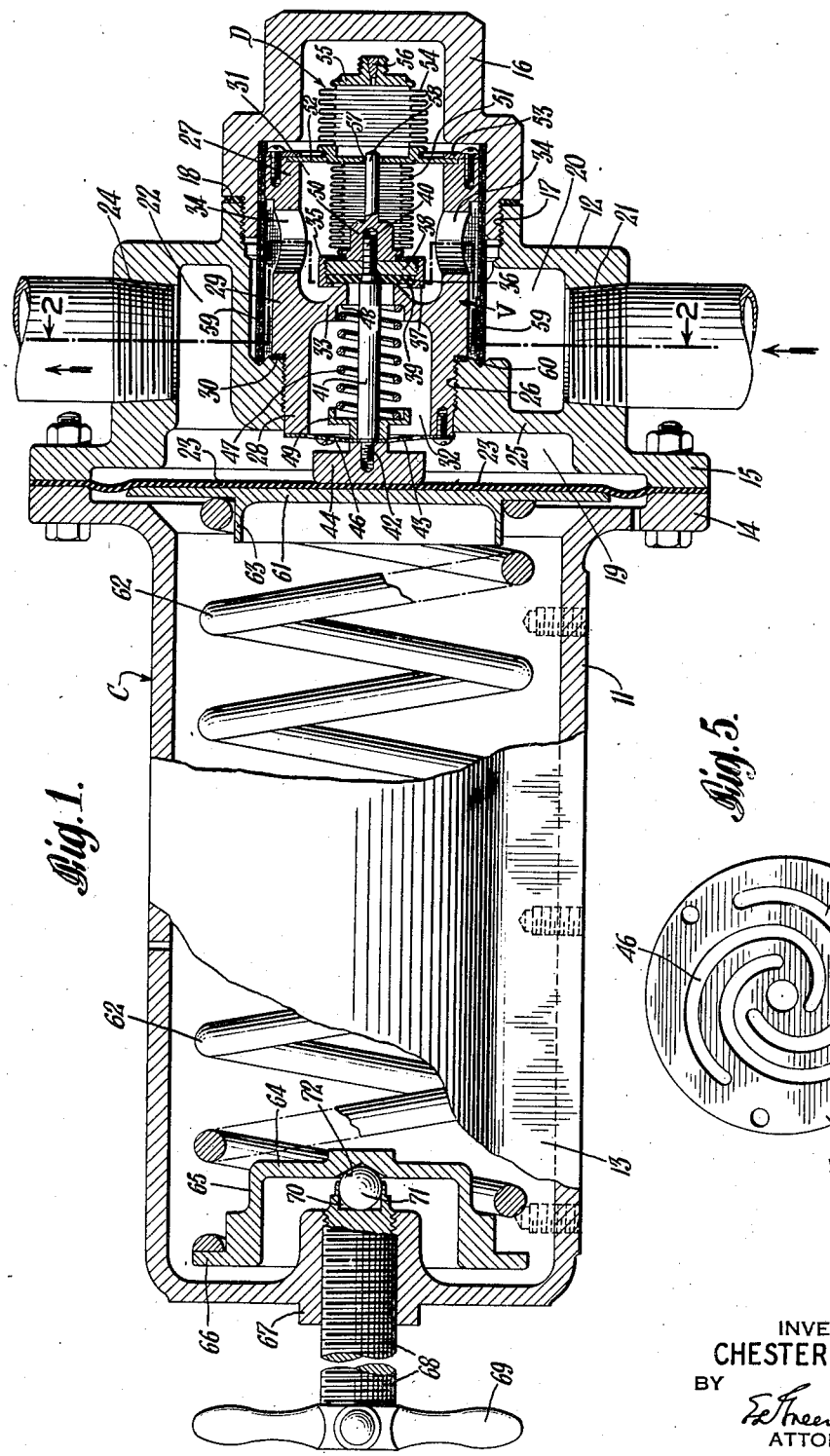
Fig. 1 is a longitudinal sectional view, parts being in elevation, of a fluid pressure regulator embodying the invention.
Figure 2:
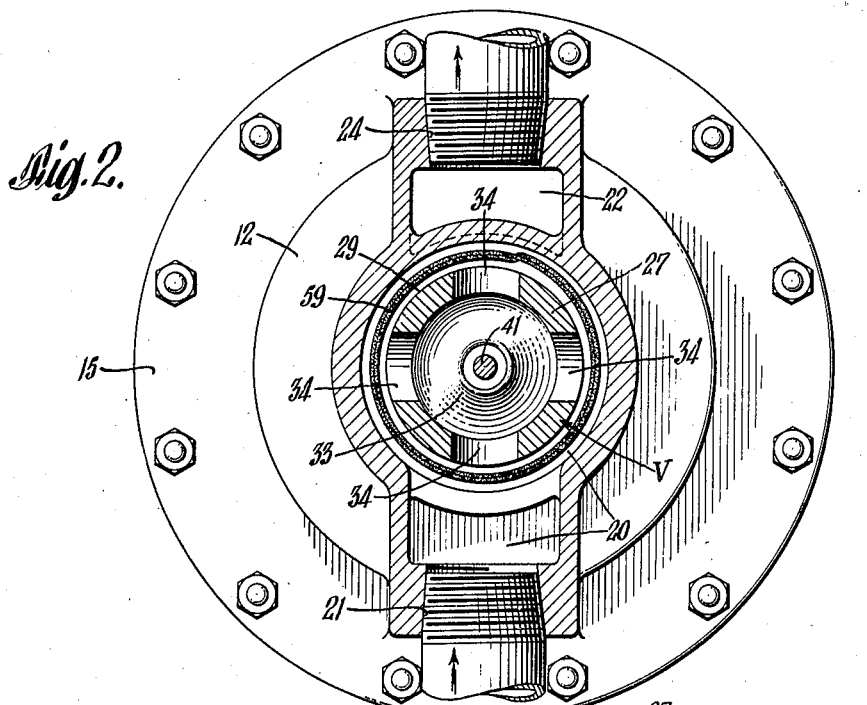
Fig. 2 is a view taken approximately on the line 2—2 of Fig. 1, looking in the direction of the arrows.

As shown in Fig. 1, a pressure regulator constructed according to the principles of the invention comprises a casing C, which includes a body 12, a hollow vented front cap 13 having an annular flange 14 secured to a flange 15 on the front side of the body 12 by bolts, and a hollow rear cap 16 threaded into a bore 17 in the opposite side of the body 12 and compressing a gasket 18 against the body to provide a fluid-tight seal. A boss 11 on one side of the cap 13 is provided with bolt holes for securing the regulator to a suitable support. The body 12 is provided with a large cavity 19 formed by a chamber 20 opening to the rear side of the body through the bore 17 and having a fluid inlet 21, and another chamber 22, having an opening in the front side of the body 12 covered by a pressure-responsive diaphragm 23 clamped between the two flanges 14 and 15, and having an outlet 24, the two chambers 20 and 22 being separated by a partition 25 having an internally threaded bore 26 axially aligned with the bore 17.

A unitary valve assembly V, which is removably disposed in the cavity 19 and is enclosed at its rear end within the cap 16, comprises a hollow cylindrical tubular housing 27 extending through the bore 17 and the inlet chamber 20 in spaced relation to their walls, having a front portion 28 threaded into the bore 26, and having a large diameter portion 29 forming an annular shoulder which compresses a gasket 30 against the partition 25. The housing 27 is divided into two chambers 31 and 32 by an internal valve seat 33 formed integrally with the housing between its ends. On the rear or inlet side of the valve seat 33 the housing 27 is provided with four equispaced large diameter radial ports 34 through its side wall which establish communication between the inlet chamber 20 and the chamber 31 in the housing.

A valve 35 comprises a seating member 36 in the chamber 31, for example a disc of rubber or like material, which is retained within an internally threaded retaining ring 37 by a metal washer 38 threaded into the retaining ring and holding the seating member 36 firmly against an annular inturned lip 39. The washer 38 is threaded over and staked to a reduced diameter rear end portion 40 of a valve stem 41, which extends through the seating member 36 and the washer 38 and projects rearwardly from the latter, and the washer abuts against an annular shoulder on the stem. The valve stem 41 extends forwardly through the chamber 32 and has an externally threaded reduced diameter forward end portion 42 passing through a central aperture in a perforate resilient centering and guiding disc 43, of phosphor bronze or the like, which is bolted to the forward end of the housing 27 in the path of flow of fluid. In front of the disc 43, the valve stem 41 is threaded into a valve stem nut or mushroom 44 pressing the disc 43 against an annular shoulder on the stem. The thin disc 43 is perforated by three generally convolute-shaped apertures or slots 46, as shown in Fig. 5, each of which starts adjacent to the center of the disc and terminates adjacent to its edge. The slots 46 permit the passage of fluid and provide for the unrestrained flexing of the disc 43 during motion of the valve stem 41.

The valve 35 is urged toward the valve seat 33, and the mushroom 44 is urged into abutting relation with the diaphragm 23, by a small coil spring 47 sleeved over the valve stem 41, seated at one end within a counterbore 48 in the outlet side of the valve seat 33, and seated at its opposite end in a spring cap 49 loosely mounted upon the stem 41 and abutting against the centering disc 43.

Figure 4:
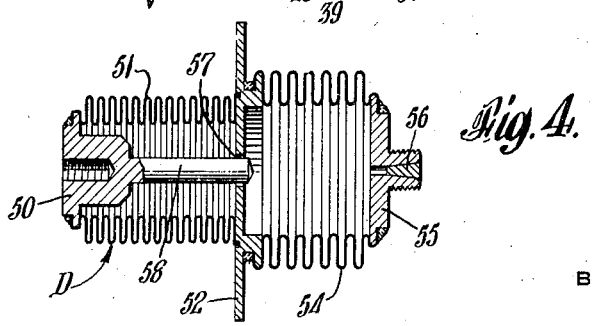
Fig. 4 is a longitudinal sectional view through the novel dash-pot of the invention.

Motion of the valve 35 is effectively damped by a removable double-bellows dashpot device D carried by the housing 27. The end of the valve stem 41 protruding rearwardly through the washer 38 is threaded into the head of a plunger 50, which in turn is secured as by soldering to an expansible metal bellows 51, of the Sylphon type, serving as a closure for the latter. At its opposite end the bellows 51 is secured, as by soldering, to the front side of a stationary bellows-supporting orifice plate 52, which is engaged within a shallow counterbore in the rear end of the housing 27 by means of an annular retaining plate 53 bolted to the housing and bearing against the orifice plate. A second expansible metal bellows 54 is secured at one end over a raised boss on the opposite or rear side of the orifice plate 52 in axial alignment with the valve stem 41 and the bellows 51. The opposite end of the last-mentioned bellows 54, which is free of restraint, is closed by a cap 55 soldered to the bellows and having an opening for a fluid, such as oil, closed by a plug 56. A centrally arranged orifice or passage 57 in the plate 52 establishes communication between the chambers within the bellows 51 and 54, the plate 52 being otherwise imperforate. The orifice 57 also assists the centering and aligning of the valve 35 with the seat 33 by guiding a stem 58 within the two bellows, comprising a part of the plunger 50, which extends within the two bellows and fits loosely within the orifice. Fluid thus can flow through the restricted annular space between the stem 58 and the wall of the orifice 57, from one bellows to the other. The removable dash-pot unit D is shown in detail in Fig. 4 separate from the rest of the regulator.

A cylindrical screen 59 surrounding the housing 27 between the ports 34 and the inlet chamber 20 is seated at its inner end within an annular V-shaped channel 60 in the partition 25, and is held firmly in position by the rear cap 16 which both bears against the opposite end of the screen, and wedges it between the external wall of the housing 27 and the internal wall of the cap. By this means the fluid, such as acetylene, which enters the regulator is cleaned of any undesirable solid particles before it passes into the more sensitive parts, where the deposit of solid material might prevent proper operation.

As previously mentioned, a pressure-responsive diaphragm 23 is clamped between a flange 14 on the front cap 13 and a corresponding flange 15 on the front side of the body 12. The mechanism for adjusting the pressure setting of the regulator is enclosed within the cap 13. A diaphragm plate 61, which is seated upon the front side of the diaphragm 23 for the even distribution of applied pressures, supports a large coil spring 62 of unusually great length seated at its inner end over an annular boss 63 of the diaphragm plate. The outer end of the adjusting spring 62 is seated over a spring cap 64 comprising a cupped portion 65 which extends within the spring, and an annular flange 66 against which the end of the spring seats. At its front end the front cap 13 comprises a hollow internally threaded hub 67 carrying an adjusting screw 68 having a handle 69 at its front end, and a socket 70 in its rear end within which is secured a bearing ball 71 formed of corrosion and wear-resistant material, such as stainless steel, which rests within a shallow conical depression 72 in the inner wall of the cup 65. Provision is thus made for longitudinal adjustment of the coil spring 62 so that any desired pressure may be applied to the diaphragm 23.

In the operation of the pressure regulator described above, a fluid, such as acetylene gas, is introduced through the inlet 21 to the inlet chamber 20 and passes through the screen 59 and the ports 34 into the chamber 31 within the housing 27. If the fluid pressure within the outlet chamber 22 is less than the opposing pressure exerted by adjusting spring 62 against the diaphragm 23, the diaphragm, which is in constant contact with the valve stem nut or mushroom 44, urges the valve 35 to the right away from the seat 33 and permits gas to pass from the chamber 31 to the chamber 32 of the housing 27, through the perforate resilient centering disc 43 to the outlet chamber 22, and thence from the regulator through the outlet 24. The passage of gas in this manner continues until the pressure in the outlet chamber 22 builds up sufficiently to exceed the force exerted upon the diaphragm 23 by the spring 62, whereupon the diaphragm is moved to the left and the small valve spring 47, assisted by the inlet gas pressure, urges the valve 35 to the left against the seat 33 and stops the passage of gas.

Under normal conditions of operation, when gas is being drawn off through the outlet 24 as rapidly as it is supplied to the regulator, the valve 35 floats in semi-open position at that distance from the valve seat 33 which will allow only enough gas to pass into the chamber 22 and thence out the outlet 24 as will produce a pressure on the chamber side of the diaphragm 23 which just equals the spring pressure on the opposite side of the diaphragm. Changes in the rate at which the gas is drawn from the outlet 24 simply cause the valve 35 to decrease or increase in distance from the seat 33 so as to permit the flow of gas at the new rate.

Slight fluctuations in the pressure of the gas supplied to the regulator, and variations in the rates of withdrawal from the regulator generally cause valves of the type described, which are supported and guided substantially without frictional resistance to movement, to vibrate toward and away from the valve seat, thus producing fluctuating pressures and rates of gas discharge. Vibrations of the valve 35 in the regulator of the present invention are damped successfully by means of the bellows damper or dashpot unit D carried by the housing 27 as a part of the unitary removable valve assembly V. As may be seen from the drawing, when the reservoir formed by the two bellows 51 and 54 and the orifice 57 is filled with a fluid of suitable viscosity, such as a light oil (other liquids, and even gases may be used, dependent upon the degree of damping required), movement of the valve 35 toward the right away from the valve seat 33 compresses the movable wall of the resilient bellows 51, thus reducing the volumetric capacity of the chamber within the same and forcing fluid through the restricted orifice 57 around the stem 58 of the plunger 50 and into the chamber within the axially aligned and opposed resilient bellows 54, thus causing the movable walls of the bellows 54 to expand toward the right. Contrarywise, when the valve 35 moves to the left toward the seat 33, it expands the wall of the bellows 51, thus increasing the volumetric capacity of the chamber within the same and sucking liquid back through the restricted orifice 57 from the bellows 54, the walls of which then partially collapse due to their resilient construction. It may be seen, therefore, that motion of the valve 35 is effectively slowed by the resistance to the flow of fluid from one bellows to the other, and vibration is prevented, while at the same time permitting the accurate positioning of the valve 35 with respect to the valve seat 33 for the correct rate of gas flow to maintain the desired pressure in the outlet 24.

Figure 3:
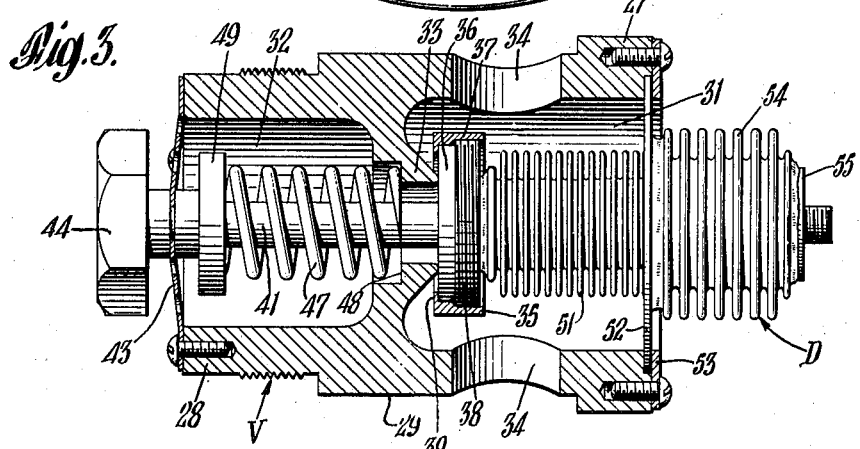
Fig. 3 is a longitudinal sectional view, parts being in elevation, of a unitary valve assembly embodying the invention.

Inasmuch as most of the principal working parts of the pressure regulator are combined into a single unitary removable valve assembly V, as shown in Fig. 3, access to any part of the assembly for repair or replacement may be gained simply by unscrewing the rear cap 16 from the bore 17, unscrewing the housing 27 from the bore 26 in the partition 25, and withdrawing the unit from the regulator.

A somewhat modified form of pressure regulator according to the invention, which is shown in Fig. 6, differs primarily from the regulator of Fig. 1, in the construction for the inlet of gas. The regulator comprises a body casting 73, to the front side of which is secured, as by bolts, a large vented cap 74 housing the pressure adjusting mechanism and having an outlet passage 75 adjacent to its edge. At its rear or inner end the outlet passage 75 in the cap 74 registers with a passage 76 in the body 73 leading from an outlet chamber 77. The rear side of the body 73 is provided with a hollow internally threaded neck 78 within which a unitary valve assembly V' is engaged by an externally threaded wall portion 79 between the ends of a hollow cylindrical housing 80, which compresses a gasket 81 against the end of the neck 78 to provide a fluid-tight seal. A hollow closure cap 82, carrying an inlet conduit 83, is threaded within the rear end of the housing 80 and compresses a gasket 84 against the housing to provide a fluid-tight seal.

The unitary removable valve assembly V' is very similar to that described in connection with Fig. 1. It comprises a hollow cylindrical housing 80 having an annular internal valve seat 85 between its ends, a valve 86 mounted upon a valve stem 87, one end of which passes through a perforate resilient centering disc 88 and is secured to a valve stem nut or mushroom 89, and the other end of which passes through the valve 86 and is operatively secured to a double-bellows damper or dashpot D' filled with a fluid, such as a light oil. The dashpot D' is secured within the housing 80 by a stationary orifice plate 90 clamped between an annular internal shoulder of the housing and the cap 82. The orifice plate 90 may be held in position during the assembling of the regulator, but prior to insertion of the cap 82, by a set screw 91 in the wall of the housing 80 bearing against the edge of the plate 90. Adjacent to its outer edges the orifice plate 90 is provided with a plurality of passages or perforations 92 which permit the free passage of fluid from the inlet conduit 83 to the valve seat 85. The valve 86 is urged toward its seat 85 by a coil spring 93 seated in the outlet side of the valve seat 85 and pressing a spring cap 94 into engagement with the disc 88 and the mushroom 89.

Operation of the valve 86 in response to the pressure of fluid in the outlet 75 is automatically controlled by pressure-responsive diaphragm 95 of rubber or like material, which is clamped between the cap 74 and the body 73 and has an aperture registering with the passages 75 and 76. As in the modification of Fig. 1, a diaphragm plate 96 rests upon the outer surface of the diaphragm 95 and supports a pressure adjusting spring 97 which is supported at its opposite end over a spring cap 98. Adjustment of the spring 97 to produce the desired pressure on the diaphragm 95 is accomplished by rotating the long adjusting screw 99 which passes through an internally threaded hub 100 in the top of the cap and bears against the inside wall of the spring cap 98.

The operation of the pressure regulator of Fig. 6 is practically identical with that of Fig. 1, the principal difference being that the fluid, such as acetylene gas, is introduced directly into the interior of the housing 80 through the perforate orifice plate 90 from the inlet 83, instead of first being introduced into a chamber in the main valve body and then into the housing through lateral ports. The unitary valve assembly V' may be removed from the regulator simply by unscrewing the cap 82 from the housing 80, and then unscrewing the housing 80 from the neck 78 of the body 73, or, if desired, the cap 82 may be permitted to remain in position while the housing 80 is unscrewed from the neck 78.

The illustrations and foregoing descriptions of pressure regulators constructed according to the principles of the invention are by way of example only. Changes in the construction and arrangement of parts may be made by those skilled in the art without departing from the spirit and scope of the invention as defined in the claims appended hereto.

I claim:

1. A fluid pressure regulator comprising, in combination, a casing having inlet and outlet openings for fluid; a valve seat between said openings; a valve movable toward and away from said valve seat; a valve stem associated with said valve, said valve stem being free of any substantial frictional resistance to its movement; centering means within said casing on one side of said seat engaging said valve stem; a stationary support on the opposite side of said valve seat having a passage therethrough; two bellows aligned with said valve and secured to opposite sides of said support in fluid-tight relation thereto, said bellows being connected together through said passage; fluid filling said bellows; means operatively connecting said valve to one of said bellows, said means including a plunger within said last-named bellows fitting loosely in said passage for centering said valve with respect to said valve seat; and means responsive to the fluid pressure in one of said openings engaging said valve stem for controlling said valve.

2. A fluid pressure regulator as claimed in claim 1, wherein said centering means comprises a thin disc of resilient material secured within said casing and engaging said valve stem, said disc having generally convolute slots therein.

3. A fluid pressure regulator comprising, in combination, a body having a chamber, and an opening for the outlet of fluid from said chamber; a removable and replaceable unitary valve assembly including a hollow housing removably engaging said body and opening at one end into said chamber, said housing extending outside of said body and constituting a portion of the exterior wall of the regulator, a valve seat in said housing, a valve movable toward and away from said valve seat, and means carried by said housing and operatively associated with said valve for damping movement of the latter; means closing the opposite end of said hollow housing, said last-named means having an opening for the inlet of fluid; and pressure-responsive means operatively associated with said valve for controlling movement thereof in response to pressure in one of said openings.

4. A fluid pressure regulator comprising, in combination, a body having a chamber, and an opening for the outlet of fluid from said chamber; a unitary valve assembly, including a hollow housing engaging said body and opening at one end into said chamber, a valve seat associated with said housing, a valve movable toward and away from said valve seat, a stationary plate engaged in said housing having a restricted orifice, two bellows aligned with said valve and secured to opposite sides of said plate in fluid-tight relation thereto, said bellows being connected together by said restricted orifice, a fluid filling said bellows, and means operatively connecting said valve to one of said bellows, said plate also having passage means therethrough outside of said bellows; means closing the opposite end of said housing and clamping said plate in position, said last-named means having an inlet opening for fluid; and pressure-responsive means operatively associated with said valve for controlling movement thereof in response to pressure in one of said openings.

5. A fluid pressure regulator comprising, in combination, a casing having inlet and outlet openings for fluid; a valve seat between said openings; a valve movable toward and away from said valve seat, said valve including a valve stem, said valve stem being free of any substantial frictional resistance to its movement; centering means within said casing engaging said valve stem; a stationary support within said casing having a passage therethrough; two bellows aligned with said valve and secured to opposite sides of said support in fluid-tight relation thereto, said bellows being connected together by said passage, said bellows being adapted to contain fluid; means operatively connecting said valve to one of said bellows, said last-named means including a plunger within said last-named bellows fitting loosely in said passage for centering said valve with respect to said valve seat; and means responsive to the fluid pressure in one of said openings for controlling the movement of said valve.

6. A unitary valve assembly adapted to be inserted as a unit into the body of a pressure regulator, said assembly comprising a tubular housing adapted to engage such body; a valve seat within said housing; a valve within said housing movable toward and away from said valve seat, said valve including a valve stem, said valve stem being free of any substantial frictional resistance to its movement; centering means for said valve stem carried by said housing on one side of said valve seat; a stationary support carried by said housing on the opposite side of said valve seat, said support having a passage therethrough; two bellows aligned with said valve and secured to opposite sides of said support in fluid-tight relation thereto, said bellows being connected together through said passage, and said bellows being adapted to contain fluid; and means operatively connecting said valve to one of said bellows, said means including a plunger within said last-named bellows fitting loosely in said passage for centering said valve with respect to said valve seat.

7. A fluid pressure regulator comprising, in combination, a casing having inlet and outlet openings for fluid; a valve seat between said openings; said regulator having a passage between said inlet opening and said valve seat; a valve movable toward and away from said valve seat; a stationary support plate covering said passage between said valve seat and said inlet opening; means engaging said support plate around the periphery thereof securing said support plate firmly to said casing; two bellows aligned with said valve and secured to opposite sides of said support plate in fluid-tight relation thereto, said bellows being adapted to contain fluid, and said bellows cooperating with said valve for movement therewith; said support plate having a passage therethrough connecting together said two bellows for the restricted flow of fluid therebetween, and also having passage means therethrough outside of said bellows for the flow of fluid through said passage from said inlet opening to said valve seat; and means responsive to the flow of fluid in one of said openings for controlling the movements of said valve.

8. A fluid pressure regulator comprising, in combination, a casing having inlet and outlet openings for fluid; a valve seat between said openings; a valve movable toward and away from said valve seat; a stationary support within said casing having a passage therethrough; two bellows aligned with said valve and secured to opposite sides of said support in fluid-tight relation thereto, said bellows being connected together by said passage, said bellows being adapted to contain fluid; means operatively connecting said valve to one of said bellows, said last-named means including a plunger within said last-named bellows fitting loosely in said passage for centering said valve with respect to said valve seat; and means responsive to the fluid pressure in one of said openings for controlling the movement of said valve.

9. A unitary valve assembly adapted to be inserted as a unit into the body of a pressure regulator, said assembly comprising a tubular housing adapted to engage such body; a valve seat within said housing; a valve within said housing movable toward and away from said valve seat; a stationary support carried by said housing, said support having a passage therethrough; two bellows aligned with said valve and secured to opposite sides of said support in fluid-tight relation thereto, said bellows being connected together through said passage, and said bellows being adapted to contain fluid; and means operatively connecting said valve to one of said bellows, said means including a plunger within said last-named bellows fitting loosely in said passage for centering said valve with respect to said valve seat.

10. A fluid pressure regulator comprising, in combination, a casing having inlet and outlet openings for fluid; a valve seat between said openings; valve means movable toward and away from said valve seat, said valve means being free of any substantial frictional resistance to its movement; a thin centering disc of resilient material secured within said casing on one side of said valve seat and engaging said valve means, said disc centering said valve means with respect to said valve seat, and said disc being adapted to flex with the movement of said valve means; and means responsive to the fluid pressure in one of said openings engaging said valve means for controlling movement thereof.

11. A fluid pressure regulator according to claim 10, also comprising means on the opposite side of said valve seat from said centering disc for assisting the centering of said valve means with respect to said valve seat.

12. A fluid pressure regulator according to claim 10, wherein said centering disc is arranged in the path of flow of fluid from said inlet opening to said outlet opening, said disc having at least one aperture for the passage of fluid therethrough.

13. A unitary valve assembly adapted to be inserted as a unit into the body of a pressure regulator, said assembly comprising a tubular housing adapted to engage such body; a valve seat within said housing; valve means within said housing movable toward and away from said valve seat, said valve means being free of any substantial frictional resistance to its movement; and a thin centering disc of resilient material secured to said housing and engaging said valve means, said disc centering said valve means with respect to said valve seat, and said disc being adapted to flex with the movement of said valve means.

CHESTER A. SIVER.